R. M. CLARK.
CUSHIONING TIRE.
APPLICATION FILED FEB. 19, 1920.
1,369,728.
Patented Feb. 22, 1921.
3 SHEETS—SHEET 1.
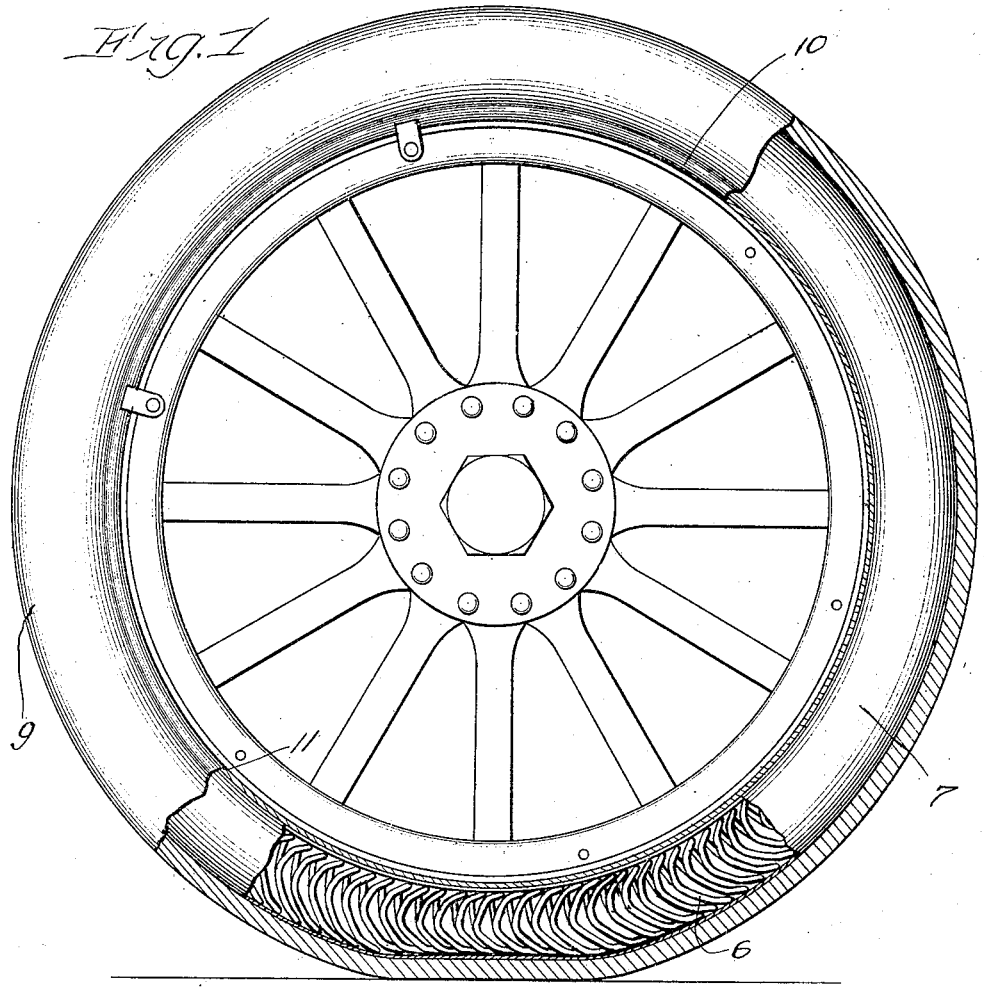
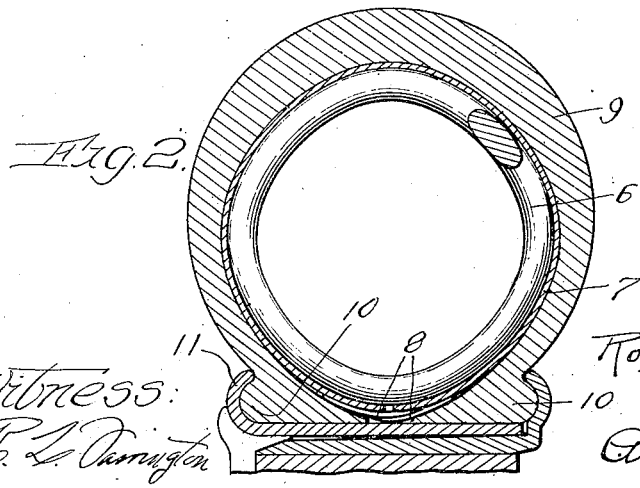

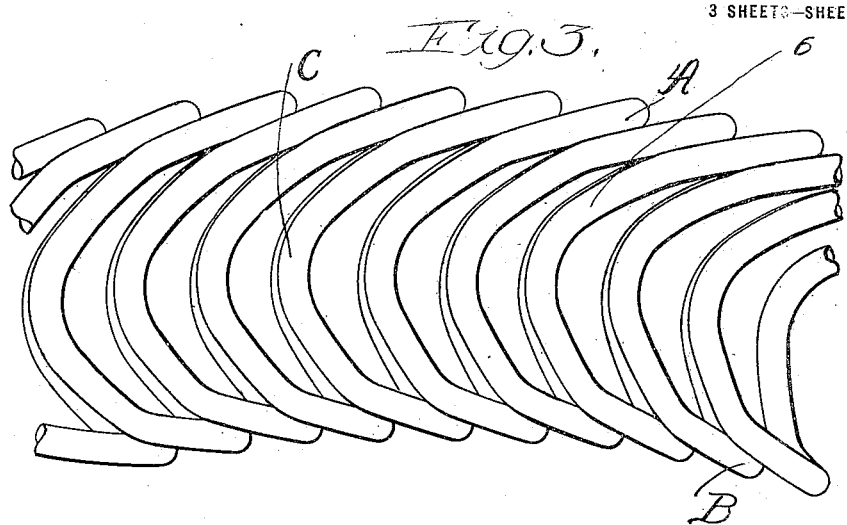
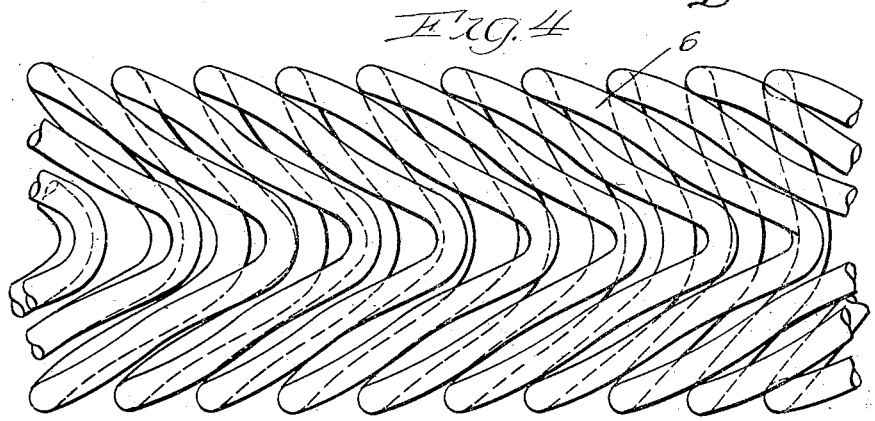
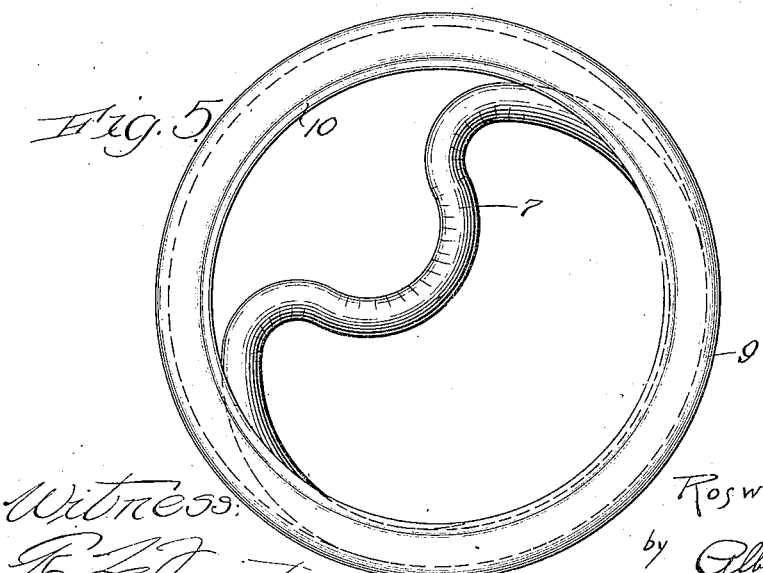

R. M. CLARK.
CUSHIONING TIRE.
APPLICATION FILED FEB. 19, 1920.
1,369,728.
Patented Feb. 22, 1921.
3 SHEETS—SHEET 3.
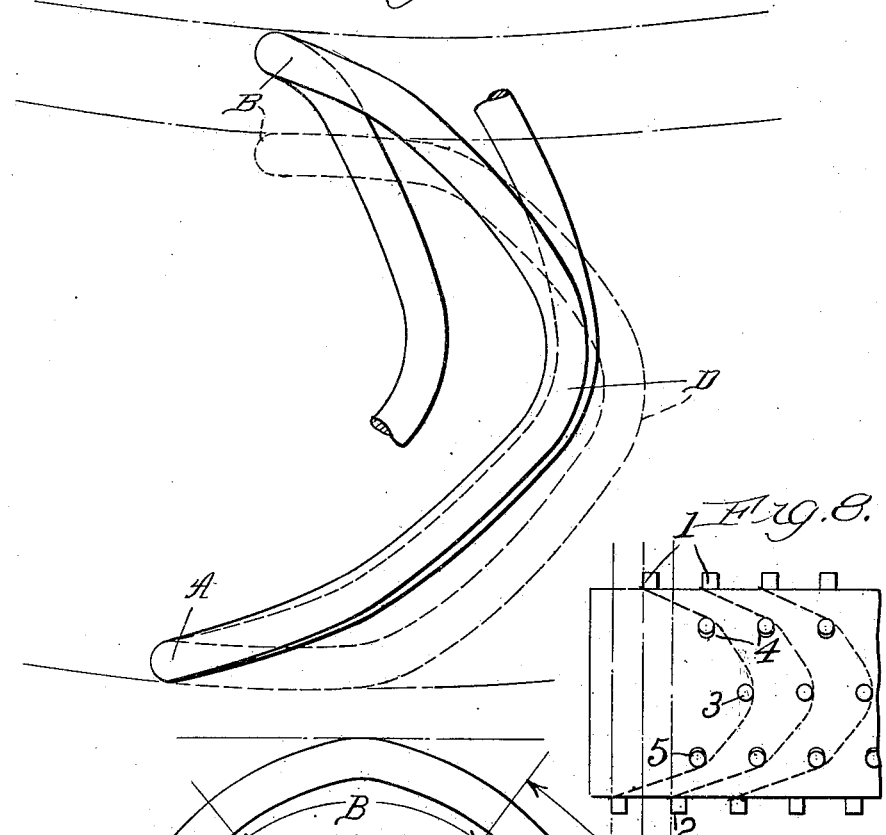
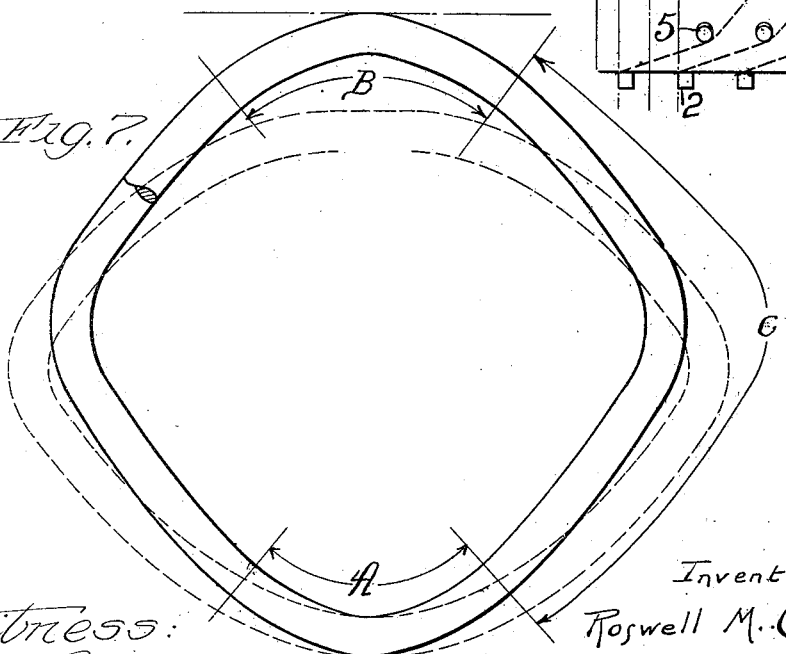
Inventor:
Roswell M. Clark
by Albert Scheible
Attorney
Witness:

UNITED STATES PATENT OFFICE.

ROSWELL M. CLARK, OF CHICAGO, ILLINOIS.

CUSHIONING-TIRE.

1,369,728.	Specification of Letters Patent.	Patented Feb. 22, 1921.

Application filed February 19, 1920. Serial No. 359,966.

*To all whom it may concern:*

Be it known that I, ROSWELL M. CLARK, a citizen of the United States, residing at Chicago, Illinois, have invented certain new and useful Improvements in Cushioning-Tires; and I do hereby declare the following to be a full, clear, and exact description of the invention, such as will enable others skilled in the art to which it appertains to make and use the same.

My invention relates to resilient wheels and more particularly to cushioning tires, one of its general objects being that of providing as the main cushioning element a coiled spring which has its turns so shaped as to utilize the resiliency thereof to an unusual extent and through an unusually large portion of each rotation of the wheel. With this in view, my invention aims to provide a coiled spring for vehicle tires in which each turn will afford resiliency not only through a contraction and a generally distributed expansion radially of the wheel, but also through a partial bending and unbending of the turns of the spring coils in directions circumferential of the wheel.

Furthermore, my invention aims to provide a coiled cushioning spring in which each turn is specially designed for this bending and unbending, and hence is adapted to afford a cushioning action through a considerable portion of each rotation of the wheel. Still another object of my invention is that of providing a single coiled spring which may readily be inserted into the ordinary outer casing of a tire in place of a pneumatic inner tube, and in which the convolutions of the spring will automatically be held by the outer tube from rotating about their axes.

Cushioning tires as heretofore built have sometimes included an endless coiled spring, but the resulting resiliency has been found very limited, owing to the fact that each turn of the coiled spring was disposed in a plane approximately radial of the axis of the wheel, so that the available resiliency was only that afforded by flexing each turn out of its normal circular form into a laterally widened oval or elliptical form. Consequently, in employing spring wire of such a diameter as to avoid a permanent set, the advisable extent of compression of each turn radially of the wheel has been quite limited. As the result, only relatively few turns of the coil would have an operative bearing at any one time, so that the cushioning afforded by such a spring was limited to that of a very small part of the spring. Attempts have been made to overcome this serious shortcoming by employing a lighter gage of wire for the spring, but these have been unsatisfactory both because of the ready damaging of the lighter spring by sudden shocks, and also because of the danger of overstraining the coil and thereby either causing some turn of it to snap or else giving one or more turns a permanent set when compressed.

Furthermore, the symmetrical contour of the ordinary coiled spring conforms so uniformly to the outer tire casing into which it may be inserted that it permits of a considerable creeping of the spring in the tire, thereby resulting in friction as well as wear.

To overcome these and other objections to coiled springs as heretofore proposed for use in cushioning tires, my invention aims to provide a coiled spring in which every turn is adapted to be bent in two relatively transverse directions, so that the resiliency will be afforded partly by expanding the turns laterally of the wheel while correspondingly compressing them radially of the wheel, and partly by increasing the extent to which each turn is bowed when viewed from the side of the wheel. Since this bowing action also implies a reduction in the size of each turn radially of the wheel, this is added to the action obtained by compressing the turn from an approximately circular section to an oval or elliptical section; consequently, the combination of these two flexing movements permits of my obtaining a much larger contraction of the loop radially of the wheel than would otherwise be possible with the same diameter and grade of resilient wire. Furthermore, by initially giving each turn of the coil such a form that each lateral half of it will appear to be decidedly bowed or arcuate when viewed from one side of the wheel, I employ a greater length of wire in each turn and can therefore utilize the resiliency of the greater length.

By thus increasing the available resiliency as well as the extent to which each turn of the coil is contracted and expanded radially of the wheel during the normal action, I am able to distribute the pressure over a much larger portion of the circumference of the wheel than was possible with the older type of wire spring coils. To increase this distribution still more while also adding further to the effective resiliency of the coil, I desirably form each turn of the coil in such a manner as to have at least one fairly well defined bending point when viewed from the side of the turn, and preferably so as to have two such bending points disposed not far from the portions of the turn which are radially inward and radially outward of the wheel. That is to say, I desirably provide the radially inward part of each turn with a relatively pointed tip portion which, when viewed from the side of the coil, departs at an angle from the main bowed or arcuate part of the turn from a given point on. By so doing, I provide an inner tip formation for each turn which is adapted to bend somewhat independently of the rest of the turn in the said bowing direction, and which is adapted to bear substantially flatwise for its entire length on the adjacent rim portion of the wheel.

Then I likewise provide a similar and even somewhat longer tip for that portion of each turn which is radially outward of the wheel, thereby affording two tip portions which are adapted to flex somewhat differently from the main portion of the coil in the direction of the said bowing.

I also desirably allow the above described tip portions which are radially inward of the wheel to project between the clencher formations on the outer tire casing, so that these elements can coöperate in preventing each turn of the spring from rotating about its axis, thereby preventing the spring from being twisted out of the position in which it is most effective in operation.

Still further objects will appear from the following specification and from the accompanying drawings, in which—

Figure 1 is an elevation of a wheel embodying my invention, with portions broken away to show the arrangement of the inner sleeve and of the spring coil.

Fig. 2 is an enlarged transverse section through the upper portion of the wheel, showing the mounting of the cushioning elements.

Fig. 3 is an enlarged side elevation of a portion of the wire spring coil when not under compression.

Fig. 4 is a plan view of the same.

Fig. 5 is a view showing the coiled spring inclosed in a sleeve or inner casing, as it appears when it is being snapped into, or taken out of, the outer casing.

Fig. 6 is a side view of a single turn of the coiled spring, showing the same both in its relaxed position and as it appears when under compression.

Fig. 7 is a view of a single turn taken at right angles to Fig. 6, showing the same both relaxed and under compression.

Fig. 8 is a diagrammatic view showing one arrangement of a mandrel used for winding the spring coil of the preceding figures.

In manufacturing the spring coil which forms one of the main parts of my invention, I initially wind the coil on a mandrel so as to form a straight spiral of the desired length, then bend the resulting coil into a ring form, and weld the free ends to each other. For winding the coil, the mandrel used may be arranged as shown diagrammatically in side elevation in Fig. 8, in which figure the mandrel includes a cylinder having a series of projecting pins arranged in rows extending longitudinally of the cylinder and with the pins in each row uniformly spaced. In this case, the row of pins 1 which are to define the outwardly directed tip ends are desirably along a line diametrically opposite to the line of pins 2 which define the bends of the coil that are to be directed radially inward of the wheel. However, the pins 2 are not in direct transverse alinement with the pins 1 but are located at the halfway points, as shown in Fig. 8 so that the corresponding half of the turn at the rear of the mandrel will in each case lead to the next pin 1. Projecting from the mandrel laterally, or at right angles to the lines of the pins 1 and 2, is a third row of pins 3, which are considerably out of alinement with the pins 1 and 2 transversely of the mandrel, so as to determine the normal extent of bowing of each turn. Moreover, each turn is deflected in the wire portion leading from the pin 1 to the pin 3 by a pin 4, which latter pin desirably is closer to the pin 1 than the pin 3. Likewise, the portion of the wire leading from the pin 3 to the pin 2 is deflected by a pin 5, which desirably is closer to the pin 2 than the pin 4 is to the pin 1. At the rear of the mandrel the wire of each turn passes over pins corresponding to the pins 5, 3 and 4 but positioned a little farther to the right in Fig. 8, so that the end of the turn which began at the left hand of pin 1 ends at the second of these pins 1.

When the wire is thus wound, it will be obvious from Fig. 8 that each half of each turn is substantially arcuate in side elevation and that each turn consists of a relatively pointed forward bend A, a somewhat less pointed inner bend B, and a pair of much longer and much less acute bend portions C respectively connecting the bends A and B. The completed spring coil 6 is desirably inclosed in an inner tube or protective casing 7 which is tightened about the spring coil by a lacing 8 at the edge of the coil facing the axis of the wheel, or adjacent to the shorter bend portions B of the individual turns. Then the incased coil is slipped into an outer casing or tread member 9 which desirably has a thickened tread portion and also desirably has outwardly directed base flanges 10 adapted to engage clencher hook formations 11 on a demountable rim, as for example after the manner shown in Fig. 2. When thus incased, it will be obvious from the above description of the manner of forming the coils, that the two wire portions forming each of the said portions C of a single turn will be somewhat flattened, as shown somewhat exaggerated in Fig. 7. Consequently, the clamping of the base formations 10 between the clencher rim parts 11 will cause the outer casing 9 to bear tightly against the somewhat flattened side portions of the coil, thus preventing any portion of the coil from rotating about its axis. This prevention of rotation is further aided by the pointing of the tip portions of each turn, as also shown in Fig. 7, so that the entire coil can readily be maintained in predetermined position without employing any auxiliary fastening devices and without using any driving dogs or the like in contact with the turns of the coil. I therefore not only avoid the possibility of having any part of the coil twist out of line, but also grip it with a firmness adequate for keeping the coil from creeping circumferentially of the wheel, but without employing any metal parts engaging the coils, which is quite important, as metal parts thus disposed will be apt to crystallize and weaken the parts of the spring with which they are in contact.

When the wheel is thus assembled, the outer casing 9 forms the tread member and also distributes some of the pressure over the various turns of the coil, being able to do this without shifting the position of the bend tips of the turns with respect to the casing, so that I avoid any friction or heating which would be caused by such shifting. To understand the action of the spring as thus constructed, it should first be noted from Fig. 3 that the outer bends A of successive turns overlap each other and that the same is true of the inner bend portions B. Moreover, each of the outer bend portions A projects circumferentially of the wheel beyond portions of several adjacent turns, and when the spring is not under compression, all of the bends A and B are disposed oblique with respect to the radii of the wheel passing through them, so that these bends contact with the parts incasing them only at the tips of the said bends. This is also shown further in Figs. 6 and 7, in both of which the full lines show a single turn of the spring portion at the bottom of the wheel as this appears when the wheel is jacked up so that there is no compressing strain on the spring. On removing the jacking, these lower spring portions would be compressed, partly by laterally distending the coil as shown in Fig. 7, and partly by approaching the tip bends A and B toward each other. In doing so, the extreme back portion D moves farther from the line joining the tip bends A and B, while these tip bends swing into positions at right angles to a radius of the wheel through them, thus affording substantially flat bearings for this portion of the coiled spring. These bearing portions may remain in their flat engaging positions while the portion C of the spring between them bends still farther, and I can therefore obtain the relatively long effective bearing shown in Fig. 1, so as to utilize the resiliency of a much larger number of turns than is possible with the ordinary winding of spring coils.

Furthermore, the increased resiliency which I secure by this arrangement enables me to bend the completed endless coil into curves having a much smaller radius than the normal radius of the coil. Consequently, the completed spring, even when incased in a jacket, can be handled after the manner of Fig. 5 for inserting it in the outer casing or for removing it if desired. By making the inwardly directed bends B shorter than the outwardly directed bends A of the coils, I can readily compensate for the differences in the circumferences adjacent to these parts of the coil, thus permitting me to use a rather close winding of the turns without having these engage one another during their normal flexing. However, while I have described a particular method of winding the needed spring and have illustrated my invention as employed with a certain form of demountable rim, I do not wish to be limited to these or other details of the construction and arrangement here disclosed, it being obvious that the same might be modified in many ways without departing from the spirit of the appended claims.

I claim as my invention:

1. In a cushioning tire, an endless coiled spring having each lateral half of every turn thereof substantially arcuate in side elevation.

2. In a cushioning tire, an endless coiled spring having each lateral half of every turn thereof substantially arcuate in side elevation, and having relatively sharp curvatures in each turn at the points thereof which are nearest to and farthest from the axis of the tire.

3. In a cushioning tire, an endless coiled spring having each lateral half of every turn thereof substantially arcuate in side elevation and having an appreciable angularity in the side elevation between each end portion of such half turn and the intermediary main portion thereof.

4. In a cushioning tire, an endless coiled spring having every turn thereof substantially arcuate in the side elevation of each lateral half thereof and having the turns so disposed that a compression thereof radially of the tire will both expand the turn laterally and flex the turn to decrease the radius of the arcuate side elevation.

5. In a cushioning tire, an endless coiled spring having each lateral half of every turn substantially arcuate in side elevation and having each turn so disposed that pressure on the same radially inward of the tire will both expand the turn laterally and flex the turn to dispose the ends of each lateral half turn substantially parallel to each other in side elevation.

6. In a cushioning tire, an endless coiled spring having every turn substantially elliptical in contour and substantially arcuate in the side elevation of each lateral half thereof.

7. In a cushioning tire, an endless coiled spring having all of its convolutions so arranged that the side elevation of the completed spring will show the nearer half of each convolution substantially arcuate in contour and bowed into an adjacent half convolution.

8. In a cushioning tire, an endless coiled spring having each turn so disposed that the portion farthest from the axis of the tire projects circumferentially of the tire beyond the center portions of a plurality of adjacent turns.

9. In a cushioning tire, an endless coiled spring having each turn somewhat flattened oblique to the medial plane of the rim, and an outer tire housing the spring and coöperating with the said flattening of the coils to prevent the coils from rotating about their axes.

10. A wheel rim having clencher formations, an endless coiled spring surrounding the medial portion thereof and having each turn thereof somewhat flattened obliquely to the medial plane of the rim, and a tread-carrying casing housing the spring and having lateral formations engaging the said clencher formations; the said formations on the casing and rim being so disposed as to cause the casing to snugly house the spring, whereby the said formations coöperate with the flattening of the coils to prevent rotary movement of said coils about their axes.

11. A cushioning tire including an endless coiled spring having inner and outer portions of each turn more oblique than the intermediate parts of the same turn, with respect to a plane axial of the tire and passing through the center of the said turn.

12. A cushioning tire including an endless coiled spring having relatively short inner and outer portions of each turn more oblique than the intermediate parts of the same turn, with respect to a plane axial of the tire and passing through the center of the said turn.

13. A cushioning tire including an endless coiled spring having relatively short inner and outer portions of each turn more oblique than the intermediate parts of the same turn, with respect to a plane axial of the tire and passing through the center of the said turn, each turn of the spring having four somewhat flattened portions symmetrically disposed with respect to the medial plane of the spring so as to approach a rhomboidal form.

14. A cushioning tire including an endless coiled spring having relatively short inner and outer portions of each turn more oblique than the intermediate parts of the same turn, with respect to a plane axial of the tire and passing through the center of the said turn, each turn of the spring having four somewhat flattened portions symmetrically disposed with respect to the medial plane of the spring so as to approach a rhomboidal form having its more acute angles at the said medial plane.

Signed at Chicago, February 17, 1920.

ROSWELL M. CLARK.